United States Patent
Jacoby et al.

[15] 3,648,240
[45] Mar. 7, 1972

[54] PERSONNEL IDENTIFICATION APPARATUS

[72] Inventors: Ian H. Jacoby, Franklin Lakes; Anthony J. Giordano, Midland Park; Warren H. Fioretti, West Caldwell, all of N.J.

[73] Assignee: Identification Corporation, Northvale, N.J.

[22] Filed: Jan. 15, 1970

[21] Appl. No.: 3,100

[52] U.S. Cl. .................................340/146.3 E, 340/149 A
[51] Int. Cl. ..........................................................G06k 9/00
[58] Field of Search........................283/7; 235/92 V, 92 DN; 250/219, 227; 356/159, 160, 71; 340/146.3, 149 A, 347 PR

[56] References Cited

UNITED STATES PATENTS

| | | | |
|---|---|---|---|
| 3,365,699 | 1/1968 | Foster | 340/146.3 |
| 3,165,730 | 1/1965 | Robinson | 340/347 PR |
| 3,371,335 | 2/1968 | Seewald | 235/92 DN |
| 3,576,537 | 4/1971 | Ernst | 340/149 A |
| 3,576,538 | 4/1971 | Miller | 340/149 A |

OTHER PUBLICATIONS

" Machine that Takes Security in Hand," Business Week, May 10, 1969, p. 151

Primary Examiner—Daryl W. Cook
Assistant Examiner—Leo H. Boudreau
Attorney—Pennie, Edmonds, Morton, Taylor & Adams

[57] ABSTRACT

Apparatus is provided to electrooptically gauge predetermined dimensions of a human hand, circuit means are provided which automatically compare the gauged hand dimensions with the same selected hand dimensions that have been previously recorded and the person's identity is either verified or rejected.

12 Claims, 13 Drawing Figures

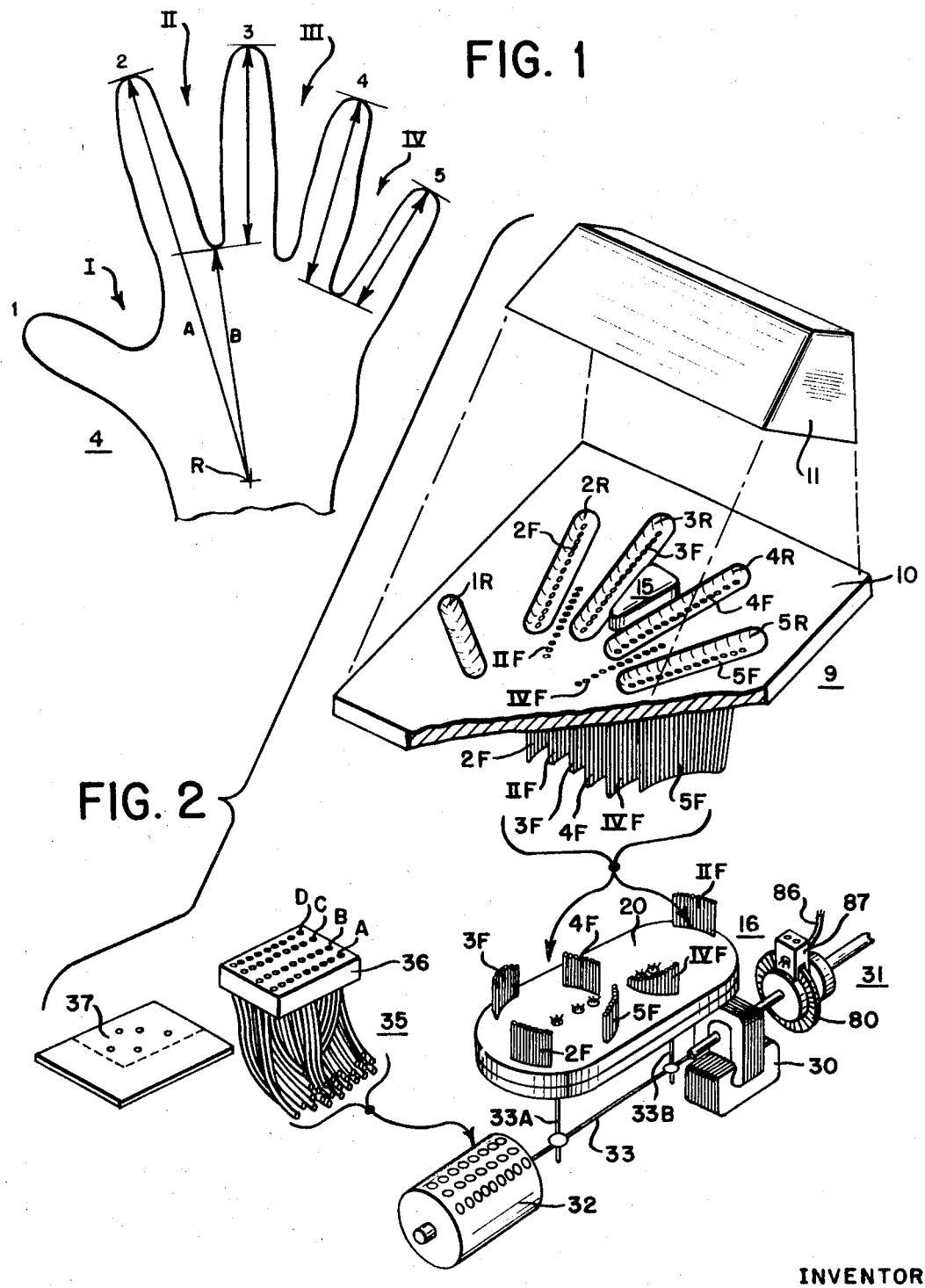

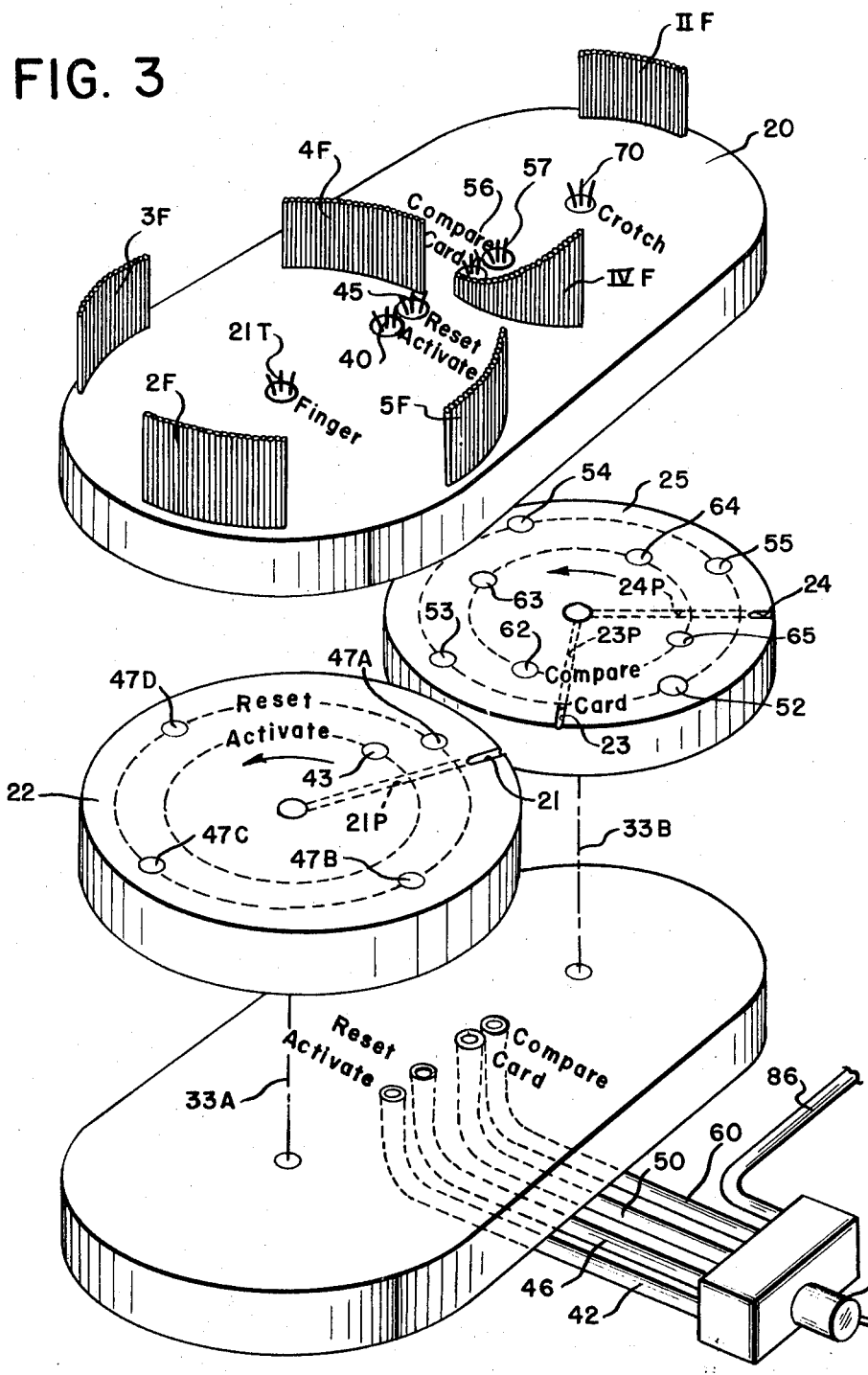

INVENTORS
IAN H. JACOBY
ANTHONY J. GIORDANO
WARREN H. FIORETTI

BY
Rennie, Edmonds, Morton, Taylor & Adams
ATTORNEYS

PATENTED MAR 7 1972 3,648,240

INVENTORS
IAN H. JACOBY
ANTHONY J. GIORDANO
WARREN H. FIORETTI

BY
ATTORNEYS

FIG. 7

Scanning Time and Sequence

| Position on Disc. | Event | | | | Digit / Ref. |
|---|---|---|---|---|---|
| 0° | Activate | | | | |
| 4° | | Clear (Reset) | | | |
| 8° | | | Card Scan (A) | | |
| 13°→63° | | | | Finger Scan (#2) | Finger 2 / Crotch II |
| 38°→88° | | | | Crotch Scan (#II) | |
| 89° | | | | | Compare (1) |
| 93° | | Clear (Reset) | | | |
| 97° | | | Card Scan (B) | | |
| 102°→151° | | | | Finger Scan (#3) | Finger 3 / Crotch II |
| 127°→177° | | | | Crotch Scan (#II) | |
| 178° | | | | | Compare (2) |
| 182° | | Clear (Reset) | | | |
| 186° | | | Card Scan (C) | | |
| 191°→241° | | | | Finger Scan (#4) | Finger 4 / Crotch IV |
| 216°→266° | | | | Crotch Scan (#IV) | |
| 267° | | | | | Compare (3) |
| 271° | | Clear (Reset) | | | |
| 275° | | | Card Scan (D) | | |
| 280°→330° | | | | Finger Scan (#5) | Finger 5 / Crotch IV |
| 305°→355° | | | | Crotch Scan (#IV) | |
| 356° | | | | | Compare (4) |

INVENTORS
IAN H. JACOBY
ANTHONY J. GIORDANO
WARREN H. FIORETTI

BY
Rennie, Edmonds, Morton, Taylor & Adams
ATTORNEYS

INVENTORS
IAN H. JACOBY
ANTHONY J. GIORDANO
WARREN H. FIORETTI

BY

ATTORNEYS

PERSONNEL IDENTIFICATION APPARATUS

RELATED APPLICATIONS

The present invention is an improvement of the personnel identification apparatus described in commonly assigned copending application Ser. No. 815,978, filed Apr. 14, 1969 now U.S. Pat. No. 3,576,538.

BACKGROUND OF THE INVENTION

1. Field of the Invention

The present invention pertains to an automated system for positively identifying human beings by gauging geometry of the person's hand and comparing that geometry with previously prerecorded information on the same hand. Geometry data, preferably including distances between fingertips and finger crotches, is utilized to provide positive personal identification with a performance characteristic better than 99 percent both on correct acceptance and correct rejection.

2. Description of the Prior Art

In many circumstances the need exists for a system which is capable of positively verifying the identity of a person without the provision of a guard or inspector to examine each person and pass or reject the individual on the basis of personal recognition. Examples of such needs are human access to restricted areas, access to restricted data in time-shared computers, administration and distribution of prescription drugs in hospitals, credit identification, time clock employee identification and the like.

Conventional identification cards are unsatisfactory in many applications in that lost or stolen cards may be readily misused with forged signatures. Identification cards carrying photographs require personal inspection to be useful and in any event photographs of unauthorized personnel may be easily substituted in stolen cards.

In the above-identified copending application, electromechanical means are provided to physically contact the fingertips and finger crotches to measure the finger lengths for comparison with finger-length data for the person seeking identification that had been previously measured and recorded on an identification card or the like. While such apparatus is capable of making consistently accurate identity verifications, it has been found that some people are wary of placing their hands into the machine in contact with a plurality of mechanically moving sensors.

It is a principal object of the present invention to provide an improved personal identification system wherein all hand geometry measurements are precisely and rapidly made by optical means which eliminate physical contact with or pressure on the hand being identified.

SUMMARY OF THE INVENTION

In accordance with the invention, identification apparatus is provided having a hand receiving platform contoured to generally conform to the palm side of the hand and retain the hand and fingers in a fixed or passive position. Means are provided for optically scanning the positioned hand to measure preselected geometrical dimensions preferably including the tip to crotch lengths of a plurality of fingers. Electrical circuit means are provided for comparing the optically measured dimensions of the live hand with the same selected dimensions previously measured and stored in an identification record submitted as a data input to the scanner. Computer means are provided which compare stored dimensions with the optically scanned dimensions of the live hand and either accept or reject the person seeking identification depending on the presence or absence of the required correlation in the comparison within acceptable tolerance limits.

Computer analysis of a large sample of finger length data has been made indicating that a remarkably high reliability of personal identification can be achieved with a measurement tolerance that can be readily satisfied by the apparatus of the present invention. Utilizing lengths of four fingers i.e., index, middle, ring and little fingers) measured from adjacent crotches and a measurement tolerance of ±0.06 inch, an identification reliability on the order of 99.5 percent can be obtained. For a measurement tolerance of ±0.03 inch, the reliability is increased to about 99.95 percent. In other words, with tolerance ranges of ±0.06 inch and ±0.03 inch, the probability of an incorrect match or cross-identification (i.e., two people having four finger lengths of one hand that are identical within this tolerance) permitting one person to be improperly identified as another person is about 0.5 percent and 0.05 percent, respectively.

DESCRIPTION OF THE DRAWINGS

In the Drawings:

FIG. 1 is a plan view of the human hand with numeral identification for the fingertip and finger crotch geometry that is measured by apparatus provided by the present invention;

FIG. 2 is a simplified exploded view of the optical and mechanical scanning apparatus that measures fingertip to finger-crotch lengths of the human hand to be identified and the corresponding lengths prerecorded on an accompanying identification card;

FIG. 3 is an exploded perspective view showing the sequential optical hand-scanning apparatus including fiber optic light commutators;

FIG. 7 is a schedule showing the time and angle sequence of the optical scanning functions performed by the apparatus shown in FIGS. 2–6;

Figure 4A:
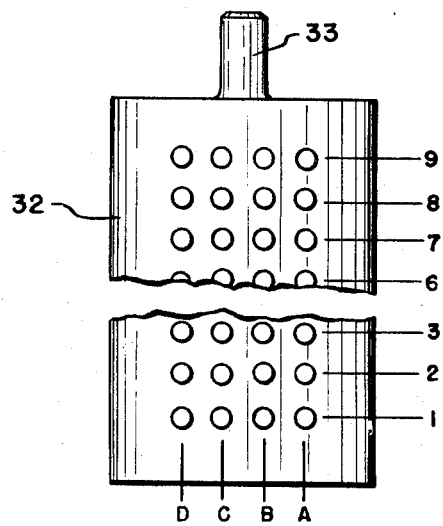
FIGS. 4A–C show plan and sectional views of the identification card scanning and optical commutating means.

For the purpose of simplifying explanation of the invention, Arabic reference numerals 1–5 are used herein to identify the fingers of the human hand 4 seeking identity verification and Roman numerals I–IV are used to identify the respective finger crotches as shown in FIG. 1. All distances are advantageously measured along lines converging to a common reference point R as shown.

In accordance with a principal aspect of the invention, means are provided for automatically verifying the identity of a human being by optically measuring a plurality of preselected dimensions of a human hand and instantaneously comparing those measurements with previously catalogued dimensions stored, for example, in a computer or on a coded card. As will be explained more fully hereinafter all measurements are made without the use of mechanical sensors contacting the hand. As shown in FIG. 2, the presently preferred embodiment includes a hand gauge 9 having a support plate 10 with angled finger receiving recesses 1R–5R disposed on the upper surface. Light source 11 is provided to illuminate the surface area of the hand plate after a hand is placed on 10, and separate coherently arrayed fiber optic sheets 2F–5F are embedded in the bases of recesses 2R–5R to sense the lengths of the respective fingers relative to the adjacent crotches II–IV. Additional fiber optic sheets IIF and IVF are embedded in plate 10 between the finger recesses 2R–3R and 4R–5R to sense the positions of the finger crotches II and IV.

As illustrated in FIG. 2, the upper end surfaces of each of the fiber optic sheets 2F–5F and IIF and IVF are positioned within the recess surfaces and top surface of plate 10 and exposed in a manner to receive light most efficiently from source 11 across the entire width of each sheet. When a hand to be identified is placed on plate 10 with the five fingers positioned in the recesses above sheets 2F-5F, shadows are formed on the linear fiber optic sheets clearly defining the end of each fingertip as well as the demarcation of each crotch. The finger lengths are accurately gauged by simply scanning the opposite ends of the coherently oriented fiber optic sheets and measuring the distance between each fingertip shadow and an adjacent crotch shadow. A raised section 15 is advantageously provided to index the positioned hand.

In accordance with a preferred embodiment of the invention, each of the fiber optic sheets in hand gauge 9 is optically scanned by a motor driven scanner 16 the internal structure of which is illustrated in FIG. 3. The opposite ends of each of the linear fiber optic sheets 2F-5F and IIF and IVF are terminated at the lower surface of plate 20 with the respective end surfaces exposed to the view of a finger scan slit 21 disposed at the edge of commutator disc 22 and a pair of finger crotch scanning slits 23 and 24 disposed at the edge of commutator disc 25 as shown in FIG. 3. Drive motor 30 is provided to synchronously rotate commutator discs 22, 25, pulse generator 31 and an identification card scanner 32 via drive shaft 33 and coupling shafts 33A and 33B.

Card scanner 32 is arranged to sequentially scan the terminal ends of a plurality of fiber optic light pipes 35, the opposite ends of which are mounted in an oriented array in card reader 36. Light pipes 35 are terminated in 36 in alignment with perforations 37 on the personal identification card representing a record of the individual's finger lengths.

In order to simplify the electronic circuitry requirements, the scanning slits 21, 23 and 24 and card scanner 32 are advantageously mechanically phased so that the scanning functions are performed in sequence thereby making it possible to use a single counter to make plural measurements on a time sequential basis. It will be apparent from the following description that simultaneous scanning of the fiber optics sheets may be effected where desired by slight modification of the scanning apparatus and the addition of plural counters.

In operation of the preferred sequential scanning apparatus illustrated in FIG. 3, the synchronously driven discs 22 and 25 perform the dual functions of scanning the fiber optic sheets and generating timing pulses which control the electronic pulse counting and comparison circuits to provide accurate finger length measurements. Light transmitted from source 11 past each finger through each of the fiber optic sheets is passed through slit 21 and light pipe 21P to the center of 22 where it is detected by phototransistor 21T. A gate activate signal is generated once each revolution of 22 by the activation of phototransistor 40 with light transmitted from lamp 41 via light pipe 42 through commutating hole 43. Counter reset pulses are generated four times during each revolution of disc 22 by the activation of phototransistor 45 with light transmitted from 41 via light pipe 46 through commutating holes 47A-D. In like manner, card read pulses are optically generated four times (once for each recorded finger length) during each revolution of disc 25 by the passage of light from lamp 41 through light pipe 50 and holes 52, 53, 54 and 55 onto phototransistor 56. Phototransistor 57 serves to generate four compare pulses during each revolution of disc 25 as a result of periodic transmission of light from 41 through light pipe 60 and holes 62-65. Phototransistor 70, optically connected to scanning slits 23 and 24 by light pipes 23P and 24P, is provided to sense the light shadow demarcation lines on fiber optic sheets IIF and IVF defining the positions of crotches II and IV. Thus each crotch-sensing fiber optic sheet is sequentially scanned twice per revolution of disc 25 to effect the measurements of fingers 2 and 3 with respect to crotch II and fingers 4 and 5 with respect to crotch IV.

As will be described more fully in connection with FIG. 7, the signal pulses produced by phototransistor 21T and 70 in the scanning of the various fiber optic sheets are utilized to start and stop the flow of gated clock pulses from pulse generator 31 supplied to a counter. Thus each finger length is measured in terms of the number of pulses counted in the scan interval between the sensed fingertip shadow and the sensed shadow of the adjacent finger crotch.

Figure 6:
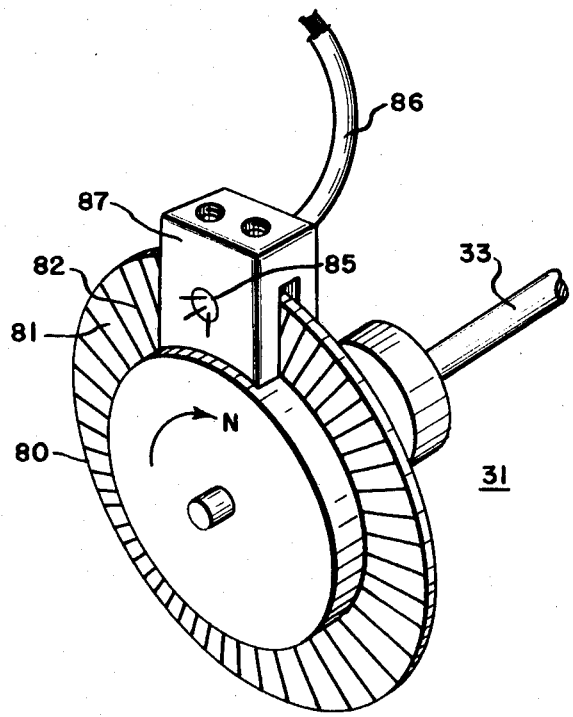
FIGS. 6 and 6A are perspective and elevation views of the optical pulse generator provided to generate periodic electrical pulses utilized to measure finger lengths.
Figure 6A:
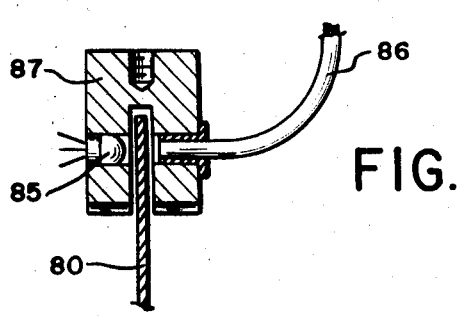

As shown in FIGS. 6 and 6A, pulse generator 31 may comprise a simple light chopping disc 80 having alternate radially disposed opaque and transparent sections 81 and 82 uniformly spaced around the entire disc. Periodic clock pulses are produced by the exposure of photosensor 85 to light from light pipe 86 interrupted by chopping disc 80.

Figure 4B:
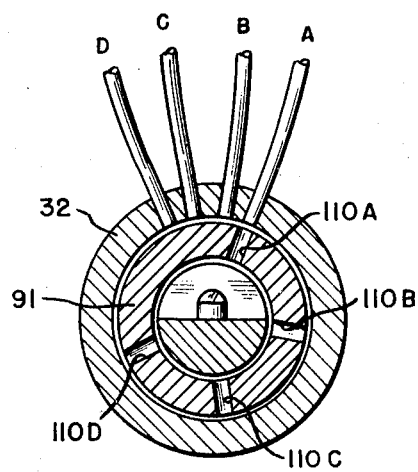
Figure 4C:
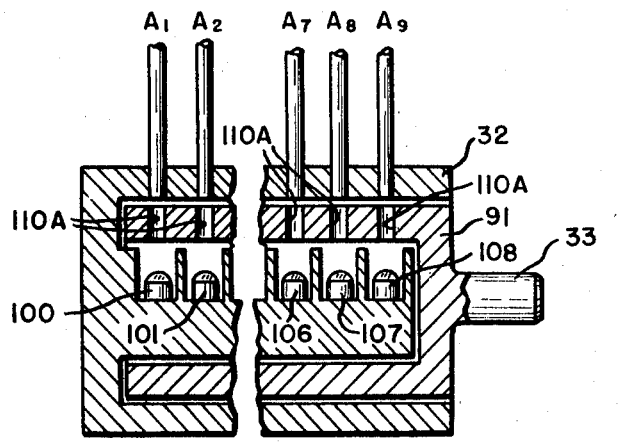
Figure 5:
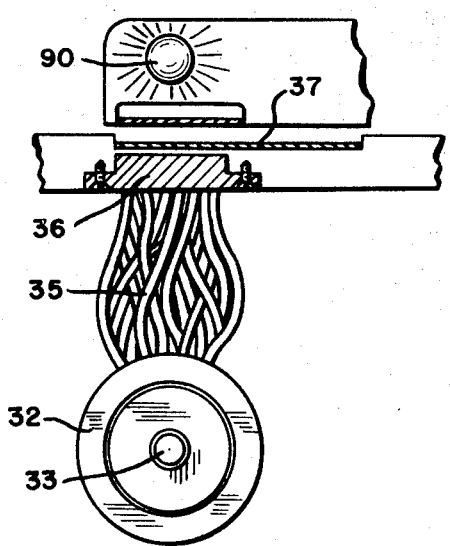
FIG. 5 is a simplified elevation view of the identification card scanning apparatus shown in FIGS. 4A–C.

Mounted at the opposite end of drive shaft 33 is the optical identification card scanner 32 which is adapted to sequentially read out from a card the prerecorded finger lengths of any hand that is presented for positive identification. Advantageously, the lengths of each of four fingers are stored in binary number form on a perforated identification card which is easily read by commutated light pipes and photosensors. In its simplest form, the identification card 37 may have four separate rows A-D of nine possible perforations to provide a nine digit binary number for recording each finger length in increments of say 0.01 inch. Four rows of nine light pipes A-D are provided to read out the binary number recording the length of each finger. As shown in FIG. 5, light from source 90 illuminates the four rows of perforations A-D on card 37. Light passed through perforations in any given row is transmitted by light pipes assigned to read the given row i.e., $A_1-A_9$, $B_1-B_9$, $C_1-C_9$, and $D_1-D_9$). Each row of light pipes (one for each of four fingers) is terminated at one end in card support plate 36 and at the other end in a fixed position cylindrical scanner drum 32 as shown in FIG. 5. Housed within 32 are nine binary photosensors 101-109 that are provided to read out the lengths of each of the four fingers A-D recorded on the identification card in binary number form. Scanning of the separate rows of light pipes A-D is effected by light commutating ring 91 rotatably driven by shaft 33. Mounted into the sidewall of 91 are four spaced rows of 9 commutating light holes 110A, 110B, 110C, 110D as shown in FIGS. 4B and 4C. Accordingly, photosensors 101-109 are sequentially exposed to light transmitted through card perforations when the light holes in the commutator ring are rotatably advanced into alignment with the row of light pipes communicating with the corresponding row of perforations on the identification card. A schedule identifying the sequence and mechanical phase angles of the respective scanning functions during each 360° rotation of discs 22 and 25 is shown in FIG. 7.

In practice, the finger length data stored in the four rows of card perforations may be readily position scrambled to effectively prevent the making of cards by unauthorized personnel. Unscrambling or decoding is easily effected by simply rearranging the light guides in rows A-D (35) to position match the pattern of the originally stored data.

Figure 8:
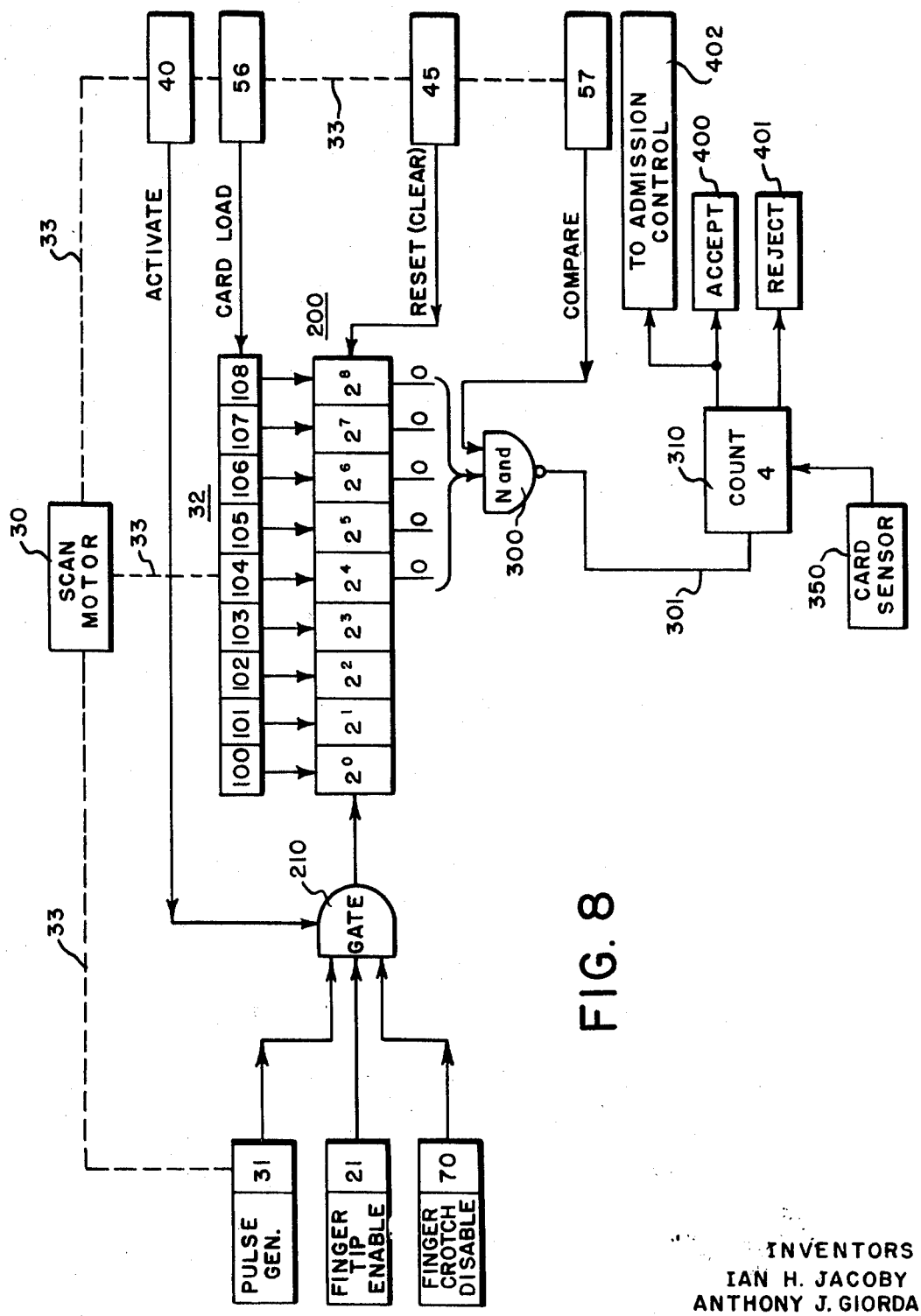
FIG. 8 is a simplified block logic diagram of electronic circuitry provided to measure the optically scanned hand and identification card.

A simplified logic diagram for effecting the electronic measurements made by the scanning apparatus shown in FIGS. 1-6 is shown in FIG. 8. Following the sequence set forth in FIG. 7, the flip-flop stages of down-counter register 200 are loaded in parallel by the card-reading photosensors 100-108 viewing the card perforations in Row A upon activation by a control pulse from phototransistor 56. The prerecorded length of finger 2 is thereby temporarily stored in register 200 in readiness for count comparison with the optically scanned live finger 2. Having been activated by a pulse from phototransistor 40 at 0° reference, AND-gate 210 is gated "on" by an enable pulse produced by phototransistor 21 upon scanning the fingertip shadow. Pulses produced by pulse generator 31 are then passed by gate 210 and serially counted down by register 200 until a disable pulse is generated by 70 upon scanning the shadow of finger crotch II.

Ideally the live optical scan measurement should exactly equal the card-stored dimension for each one of the four fingers and the serially counted pulses should exactly null out the count loaded into the counter in parallel from the card. As a practical matter, however, it is generally desirable to provide a certain tolerance to accommodate measuring error so that the machine will accept a person if each finger measurement matches the stored measurement within a tolerance limit of say ±7 counts or a total maximum deviation, for example of 0.14 inch. A final comparison between stored (card) and scanned dimensions is effected by sampling the remaining count in the last five flip-flops ($2^4$-$2^8$) of register 200 with NAND-circuit 300. If each of the final five flip-flops has been down-counted to zero, the maximum value of the difference between the two measurements has to be 15 or less. Comparison is effected upon the generation of a compare pulse by phototransistor 57. If all inputs to the NAND-circuit 300 are zero, then an output pulse is supplied via 301 to count-four counter 310 indicating an acceptance of the particular finger. Register 200 is then cleared or reset to zero count by phototransistor 45 and the scanning sequence is repeated three more times as indicated in FIG. 7 for each of the remaining three fingers. If the measurements of all four fingers match those measurements stored on the card within the given tolerance, counter 310 will receive four accept pulses from 300 and an output signal will be supplied to energize an accept or verification indicator 400 and an admission control 402 such as an electrically controlled lock etc. Reject indicator 401 is energized by counter 310 when fewer than four finger measurements match those stored on the card. Counter 310 is cleared by a pulse from phototransistor 350 mounted in block 36 and arranged to sense the insertion of each new identification card.

It will be apparent to those skilled in the art that the logic and pulse counting circuits shown in FIG. 8 may be readily modified to provide any desired measurement tolerance. It will also be appreciated that separate counters may be employed, if desired, to make separate counts for each hand dimension that is measured.

Figure 9:
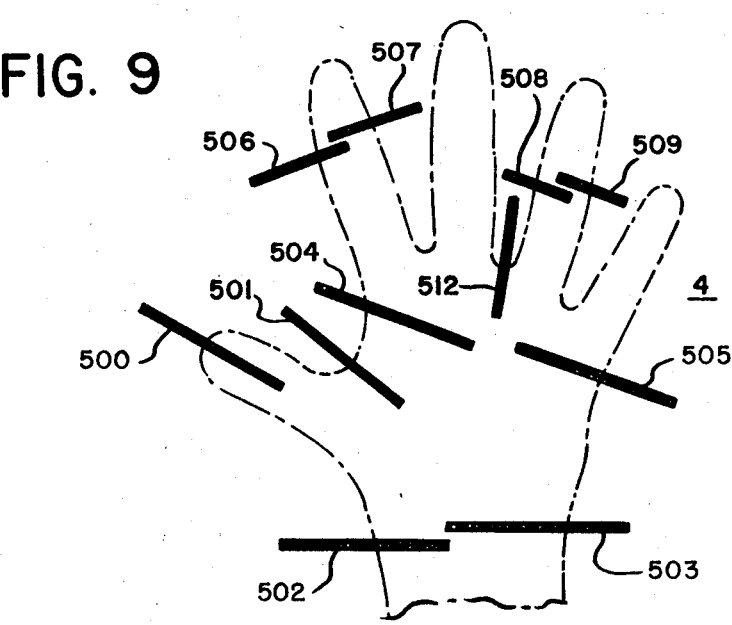
FIG. 9 is a plan view of the human hand showing placement of optical scanning means for measuring additional verification dimensions.
Figure 10:
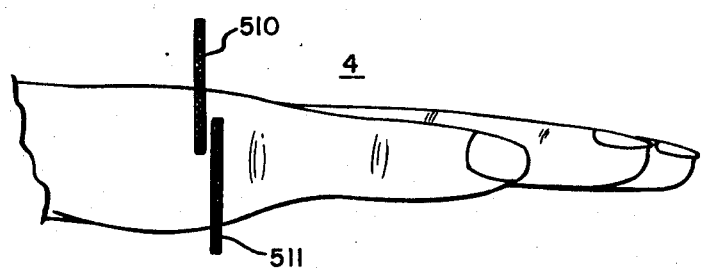
FIG. 10 is an elevation view of a human hand showing placement of optical scanning means in the vertical plane for measuring an additional verification dimension.

As indicated above, it is possible to obtain an identification accuracy of about 99.5 percent utilizing the apparatus described which measures (and compares) length dimensions of four fingers. In applications which may require still greater accuracy of discrimination, additional hand geometry measurements may be made as illustrated, by way of example, in FIGS. 9 and 10. Additional hand geometry measurements may be made in the same horizontal plane as shown in FIG. 9 or in the vertical plane as shown in FIG. 10. Using the same scanning techniques as described above, the length of the thumb 1 may be measured by fiber optic sheets 500, 501. Similarly, the wrist may be measured by sheets 502, 503; the first metacarpal width by sheets 504, 505; the width of fingers 2 and 4 by sheets 506, 507 and 508, 509, and crotch III detected by 512.

Additional verification accuracy may be achieved by measuring predetermined vertical dimensions of the hand such as palm height by the scanning of illuminated fiber optic sheets 510, 511 as illustrated in FIG. 10.

It has been found that with only a modest increase in equipment complexity to permit several additional hand geometry measurements such as those shown in FIG. 9, identity verification accuracy can be enhanced to a level greater than 99.9 percent.

It will be apparent to those skilled in the art that various other equivalent optical scanning arrangements may be substituted for the illuminated fiber optic sheets and light guides described and illustrated herein. It will also be apparent that the stored hand geometry data may be stored equally well in a computer memory, in magnetic tapes or encoded cards, as well as on photographic film or the like. Where desired, the identification apparatus may be operated in conjunction with auxiliary apparatus which requires the person seeking verification to remember an identification code that must be additionally keyed into the system in order to obtain identity verification.

We claim:

1. Personnel identification apparatus comprising:
   a. means having a generally planar surface for supporting the hand of a person seeking identity verification;
   b. means for illuminating the peripheral edge surface of said supported hand;
   c. Optic scanning means including photosensor means for generating spaced electrical pulses having a time separation corresponding to the distance between each of a plurality of selected points located along said illuminated hand periphery, said points being variably positionable with respect to said planar surface; and
   d. Electronic circuit means responsive to said spaced electrical pulses for measuring and indicating distances between pairs of said selected points.

2. Apparatus in accordance with claim 1 characterized in that the plurality of selected points includes the fingertip to finger crotch length of each of a plurality of fingers.

3. Apparatus in accordance with claim 1 characterized in that the optical scanning means includes fiber optic light guides positioned to provide rectilinear optical scanning along the longitudinal axis of each of a plurality of fingers and along the longitudinal axis of at least one finger crotch.

4. Personnel identification apparatus comprising:
   a. plate means for supporting a hand on a surface of said plate with the fingers oriented in predetermined positions;
   b. light means for illuminating a hand supported on said plate;
   c. optical scanning means including light responsive means for generating spaced electrical pulses having a time separation corresponding to the fingertip to finger crotch length of each of a selected plurality of fingers; and
   d. electronic counter means for measuring the time separation between the spaced electrical pulses generated for each of said plurality of fingers.

5. Personnel identification apparatus comprising:
   a. means having a generally planar surface for supporting the hand of a person seeking identity verification;
   b. means for illuminating the peripheral edge of said supported hand;
   c. Optical scanning means including photosensor means for generating spaced electrical pulses having a time separation corresponding to the distance between each of a plurality of selected points located along said illuminated hand periphery, said points being variably positionable with respect to said planar surface;
   d. Electronic circuit means responsive to said spaced electrical pulses for measuring and indicating distances between pairs of said selected points;
   e. Storage means for prerecording the distances between each of the plurality of said selected points; and
   f. Circuit comparator means for comparing each of the prerecorded distances with each of the corresponding distances between selected points measured by the optical scanning means.

6. Apparatus in accordance with claim 5 wherein the comparator means produces an output signal when correlation exists between a prerecorded distance and a corresponding optically scanned distance.

7. Apparatus in accordance with claim 5 characterized in that said storage means comprises an identification card on which each of the prerecorded distances is digitally stored.

8. Apparatus in accordance with claim 1 wherein said electronic circuit means includes a clock pulse generator, a pulse counter and a gate operated between on and off conditions by said spaced electrical pulses to thereby control the flow of clock pulses to said counter.

9. Personnel identification apparatus comprising:
   a. means having a generally planar surface provided to support the hand of a person seeking identity verification;
   b. means for illuminating the peripheral edge surface of said supported hand;
   c. optical gauge means comprising at least one photosensor having associated therewith a movable viewing aperture for sensing a plurality of spaced points along the illuminated peripheral edge of said hand and producing a separate response signal identifying each of said spaced peripheral points; and d. electronic circuit means responsive to said separate response signals provided to measure and indicate distances between predetermined spaced peripheral points.

10. Personnel identification apparatus comprising:

a. means having a generally planar surface provided to support the hand of a person seeking identity verification;

b. means for illuminating the peripheral edge surface of said supported hand;

c. optical gauge means comprising at least one photosensor having associated therewith a movable viewing aperture for sensing a plurality of spaced points along the illuminated peripheral edge of said hand and producing a separate response signal identifying each of said spaced peripheral points;

d. electronic circuit means responsive to said separate response signals provided to measure and indicate distances between predetermined spaced peripheral points;

e. storage means for prerecording the distances between the predetermined spaced peripheral points; and f. circuit means for comparing each of the prerecorded distances with each of the corresponding distances between the predetermined spaced peripheral points.

11. A method of identifying personnel comprising the steps of:

a. supporting the hand of a person seeking identity verification on a generally planar surface;

b. illuminating the peripheral edge of said supported hand;

c. generating by optical scanning means including photosensor means spaced electrical pulses having a time separation corresponding to the distance between each of a plurality of selected points along said illuminated hand periphery wherein said points are variably positionable with respect to said planar surface;

d. measuring in response to said spaced electrical pulses the distance between pairs of said selected points; and e. indicating distances between pairs of said selected points.

12. The method of claim 11 further comprising the steps of:

f. prerecording the distances between each of the plurality of said selected points; and g. comparing each of the prerecorded distances with each of the corresponding distances between selected points measured by the optical scanning means.

* * * * *